United States Patent Office 3,567,531
Patented Mar. 2, 1971

3,567,531
HIGH ENERGY THIXOTROPIC FUEL COMPOSITIONS
Glenn Fuller and Alfred John Lawrence Toombs, Berkeley, Calif., assignors to Shell Oil Company, New York, N.Y.
No Drawing. Continuation-in-part of application Ser. No. 302,444, Aug. 15, 1963. This application Mar. 17, 1964, Ser. No. 352,682
Int. Cl. C10l 7/00
U.S. Cl. 149—87                  16 Claims This application is a continuation-in-part of application Ser. No. 302,444, filed Aug. 15, 1963.

This invention relates to new and novel thixotropic hydrocarbon compositions containing dispersed therein finely divided metals and hydrides thereof and to methods of forming said thixotropic compositions. More particularly, the present invention pertains to gelling in situ liquid hydrocarbons containing combustible solids, e.g., metal or metal hydride particles, by means of a novel additive of the present invention.

It is known that certain finely divided metals such as beryllium, boron, magnesium, aluminum and their hydrides when stably suspended in liquid hydrocarbons provide high-energy fuels for air-breathing applications. Also such metal and metal hydride suspensions in hydrocarbons when used with certain oxidizers such as hydrogen peroxide, function as storable high-energy fuels in high-energy liquid bi-propellant systems. However, the problem of keeping these metals stably suspended in the liquid carrier is a difficult one and the use of various suspending agents such as soaps or thickeners such as organic polymers, e.g., polyvinyl chloride, has proved to be ineffective, particularly when the suspension has to be maintained for long periods of time.

More recently, it was found and disclosed by Calhoun and Toombs in U.S. Pat. No. 3,105,747, issued Oct. 1, 1963, that effective thixotropic gels are produced by incorporating certain metal salts of $C_{4-18}$ hydrocarbylthiomethyl phosphonic acids in liquid hydrocarbons, and that various metals can be dispersed therein by admixing into the gel. However, it has also been found, as will be shown below, that such gels while giving good dispersions nevertheless are somewhat deficient in shear stability, that is, the capability of reforming a stable gel after being subjected to severe shearing action.

Now in accordance with this invention, novel stable dispersions or suspensions of solid metal or metal hydride particles or powders in liquid hydrocarbons in mobile thixotropic suspension can be accomplished by admixing with hydrocarbon slurries containing metals, e.g., trivalent metals and their hydrides, from about 0.15% to about 10%, preferably from about 0.2% to about 5% by weight of a mixture of 2.0–10% by weight of a di- to tri-basic pentavalent phosphorus acid having from 0 to 1 monohaloalkyl substituents, wherein the alkyl group contains from 1 to 4 carbon atoms, and 98.0–90% by weight of a $C_{1-18}$ monoalkyl ester of a $C_{4-18}$ hydrocarbylthiomethyl phosphonic acid, wherein R is a $C_{4-18}$ hydrocarbyl radical, e.g., $C_{4-18}$ alkyl radical.

The esters can be prepared by reacting an alkali metal mercaptide with a diester of chloromethyl phosphonic acid and hydrolyzing with a base one of the ester groups. Thus, for example, monobutyl 2-thiadodecylphosphonate was prepared as follows:

In a 5-liter 3-neck flask equipped with stirrer, dropping funnel and condenser was placed 435 g. (2.5 moles) of n-decyl mercaptan, 174 g. of 85% potassium hydroxide pellets (2.6 moles pure KOH) and 1375 ml. of ethanol. The mixture was stirred until all the pellets had dissolved, at which time 606 g. (2.5 moles) of dibutylchloromethyl phosphonate was added slowly through the dropping funnel. Addition took about three hours as the reaction was quite exothermic. The heat was turned on and the system allowed to reflux for 20 hours. The mixture was cooled and water added until two phases separated. The organic phase was removed, the aqueous phase was extracted with 2×300 ml. of ether and the extracts were added to the organic phase. The combined ether solution was dried over anhydrous magnesium sulfate and the ether was removed by distillation. Unreacted dibutylchloromethyl phosphonate was removed by stripping to a kettle temperature of 165° C. at 1 mm. The yield of bottoms product was 708 g. (75%).

A mixture of 190 g. (0.5 mole) of dibutyl 2-thiadodecylphosphonate and 38 g. (5% excess) of KOH pellets in 500 ml. of ethanol was refluxed for 22 hours. The mixture was cooled and diluted with water until a slight organic phase (unreacted dibutyl ester) formed. The organic phase was removed and the aqueous phase was extracted once with 300 ml. of ether. The extract was discarded. The aqueous solution was then acidified with dilute hydrochloric acid. An organic (product) phase formed. This was removed by extraction with 300 ml. of ether. The combined ether extracts were stripped first on house vacuum, then at 160° C. and 3.5 mm. of mercury to give 108.5 g. (67%) of monobutyl ester.

The monoester of hydrocarbylthiomethyl phosphonic acid can also be prepared by esterifying with a $C_{1-4}$ alkanol, e.g., methanol or butanol, hydrocarbylthiomethyl phosphonic acid.

Another method of making the thiomethylphosphonates is to react a suitable mercapto compound, such as an alkali metal, e.g., Na or K, $C_{4-18}$ alkyl mercaptide with an alkali metal, e.g., Na or K, salt of chloromethyl phosphonic acid in an alcoholic solution under reflux conditions and under an inert atmosphere to form the alkali metal salt of an alkylthiomethyl phosphonic acid. The salt is then treated with a strong acid such as hydrochloric acid to spring free the alkylthiomethyl phosphonic acid, which can be converted into the desired monoester.

The following monoesters are illustrative examples of gelling agents for metal powders suspended in liquid hydrocarbon carriers: monobutyl 2-thiadodecylphosphonate, monobutyl 2-thiatetradecylphosphonate, monomethyl 2-thiadodecylphosphonate, monoethyl 2-thiatetradecylphosphonate, monobutyl cyclohexylthiomethyl phosphonate, monobutyl benzylthiomethyl phosphonate; and mixtures thereof.

The foregoing-described pentavalent phosphorus acids, which are used in conjunction with the monoester in the compositions of the invention, correspond to the following chemical formula:

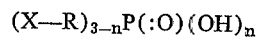

$$(X\text{—}R)_{3-n}P(:O)(OH)_n$$

wherein X is a halogen atom, n is a whole number of from 2 to 3, and R is an alkyl group having from 1 to 4 carbon atoms and preferably from 1 to 2 carbon atoms. Chlorine is a preferred halogen substituent. Particularly preferred species of the above-described acid are monochloromethyl phosphonic acid and phosphoric acid.

The high-energy metal powders and their hydrides effectively gelled by the additives of this invention include beryllium, boron, magnesium, aluminum, iron and/or titanium and the like, the metals beryllium, aluminum, boron and iron being particularly preferred. It is preferred that the particles of the powders be less than 200 microns in diameter and preferably between 1.0 and 10 microns on average. Mixtures of the metals may be used and di- or tri-modal mixtures of particle sizes may be employed for the purpose of providing more stable suspensions and suspensions having special properties.

It is desirable to provide thixotropic composition containing the maximum amount of particulate combustible solids possible. Thus, it may be desirable to include auxiliary agents such as viscosity modifiers, wetting agents, and suspending agents for the purpose of facilitating mobility and pumpability and maintaining the solid in thixotropic state while at the same time maximum solids content is achieved. A number of classes of dispersing agents are useful for this purpose such as:

(1) Hydrocarbon-soluble hydrolyzed copolymer of $C_{12-30}$ straight-chain alpha olefins with 0.5–5 mol (per mol of olefin) of a vinyl ester, e.g., vinyl formate, vinyl acetate, vinyl butyrate or vinyl benzoate, mol wt. 4000–15,000. An example of such a copolymer is a 95% hydroxyzed copolymer of $C_{16-18}$ alpha olefin and vinyl acetate (⅕ mol ratio) having a molecular weight of about 27,000.

(2) Copolymers of (a) a monovinyl substitute pyridine, (b) lauryl and stearyl methacrylate in a mol ratio between 1:4 and 4:1 and (c) a $C_{1-4}$ alkyl acrylate, mol wt. $5 \times 10^4$ to $2.5 \times 10^6$. An example of such a copolymer is a copolymer of 2.52 mol of stearyl methacrylate, 5.04 mol of lauryl methacrylate, 0.83 mol of methyl methacrylate and 1 mol of 2-methyl-5-vinylpyridine.

(3) Sorbitan, glycol sorbitan, and polyoxyethylene sorbitan esters of $C_{14-18}$ fatty acids.

(4) Polyoxyethylene esters of $C_{12-18}$ fatty acids.

(5) High mol wt. fatty acids, esters of $C_{6-16}$ fatty alcohols. Specific examples include: glycol sorbitan laurate, polyoxyethylene sorbitan distearate, polyoxyethylene stearate, hexadecyl alcohol.

The thixothropic compositions of the present invention can contain as little as 2% by weight solids or as much as 90% by weight solids. However, substantial amounts (90–25% by weight) of combustible solids are preferred. The suspending proportions of normally liquid hydrocarbon will therefore contain from 10–98% and preferably from 10–75% hydrocarbon and an amount of the above-discussed mixture of ester and acid equivalent to 0.15–10% by weight of the total composition weight. Effective dispersing amounts of dispersion agents or viscosity modifiers as described above will vary from one composition to another, depending upon the specific dispersing agent and viscosity modifier and the specific solids used.

The normally liquid hydrocarbon in which the combustible solids are suspended may be one or a mixture of hydrocarbons ranging from light liquid hydrocarbons such as the gasolines through lubricating oils. For use in ram jets and the like, it is preferred that fuels normally employed for jet propulsion be utilized. These are normally special hydrocarbons, hexane, heptane, diethylcyclohexane, cyclohexane or petroleum cuts in the kerosene boiling range but may include gas oils or higher boiling gasolines as well. Still higher volumetric thermal value is obtained by utilizing as the suspending fluid highly saturated naphthenic materials such as decalins and alkylated decalins wherein the alkyl radicals have from 1 to 4 carbon atoms each. These may be modified by the presence of polycyclic hydrocarbons, preferably saturated, such as dimethanodecalins.

While the monoester component of the mixture employed in the composition of the invention is the same as those from which the metallic salts of U.S. 3,105,747 are prepared, it has been found quite unexpectedly that the monoester-acid mixture forms gels with hydrocarbon liquids in a different manner and by an apparently different mechanism. Moreover, the gels formed from the monoesters have superior properties as is illustrated by the following examples.

EXAMPLE I

A firm gel was formed in the manner taught by U.S. 3,105,747 by adding 1.5% by weight of the aluminum salt of 2-thiadodecylphosphonate to diethylcyclohexane. To 40% by weight of the gel was added 60% by weight of powdered aluminum and the mixture was subjected to high shear mixing. The mixture regelled upon standing but was lumpy in texture and separation of liquid from the gel was observed.

EXAMPLE II

To a mixture of 40% by weight diethylcyclohexane and 60% by weight powdered aluminum was added only 0.5% by weight of an additive mixture consisting of 5% by weight of monochloromethyl phosphonic acid and 95% by weight of monobutyl-2-thiadodecylphosphonate. A soft get was formed within 30 minutes which became firm upon standing a few hours. The gel was smooth in texture and no separation of liquid was observed.

EXAMPLE III

When the same relative amount of the additive mixture of Example I (0.5/40=0.125% by wt.) was added to diethylcyclohexane, the solution is unchanged in consistency and there is no gel formation. However, when 60% by weight (basis total mixture) powdered aluminum was added to the solution, the mixture thickened and formed a soft gel which upon standing became firm. The gel was smooth in texture and free of curds or lumps. Upon being subjected to shearing action, the gel, being thixotropic, became fluid; however, after cessation of the shearing action, the gel formed once again and possessed the same properties as originally.

From the foregoing three examples, it is apparent that the gels formed by the compositions of this invention are superior in their properties, i.e., stability, smoothness and ability to reform a gel after being pumped, mixed or otherwise subjected to shearing action. Furthermore, the mechanism of gel formation is obviously different. For in the case of the phosphonate salts referred to in U.S. 3,105,747, metal particles can be suspended only when they are added to an already formed gel comprised of the salt and the hydrocarbon. However, in the composition of the invention, no gel is formed by adding the mixture of acid and monoester to the hydrocarbon. Only when the metal particles are admixed with a solution of the hydrocarbon and additive is a gel structure formed. It is apparent in the case of the former that the metal is merely suspended in the gel. The mechanism of gel formation for the present invention is, however, not fully understood though it appears that the metal particles may be partially solvated, which accounts for the smoother and more stable dispersion.

An important variable in the composition of the invention is the amount of acid relative to the amount of monoester in the additive, which is shown by the following example.

EXAMPLE IV

Separate quantities of 3, 5 and 10% by weight of additive solutions of monochloromethyl phosphonic acid in monobutyl-2-thiadecylphosphonate were prepared and a series of compositions were prepared containing 60% powdered aluminum, 40% diethylcyclohexane and from 0.1–1.0% by weight of each of the three additive solutions. Each of these compositions was mixed and observed with regard to gelling ability. For comparison, a composition containing the same amounts of aluminum and diethylcyclohexane plus 0.5% of monobutyl-2-thiadodecylphosphonate alone without the acid was also prepared. The results of these gellation tests were as follows:

TABLE I.—EFFECT OF ADDITIVE CONCENTRATION AND ACID CONTENT ON GEL FORMATION

| Acid [1] content of additive, percent wt. | Ester [2] content of additive, percent wt. | Total additive concentration, percent wt.[3] | Time for gel formation, hrs. |
| --- | --- | --- | --- |
| 0 | 100 | 0.5 | No gel formed. |
| 3 | 97 | 0.1 | Do. |
| 3 | 97 | 0.2 | 2 hours. |
| 3 | 97 | 0.5 | 1 hour. |
| 3 | 97 | 1.0 | Less than ½ hour. |
| 5 | 95 | 0.1 | Slight thickening only. |
| 5 | 95 | 0.2 | 2 hours. |
| 5 | 95 | 0.5 | ½ hour. |
| 5 | 95 | 1.0 | Less than ½ hour. |
| 10 | 90 | 0.1 | No gel formed. |
| 10 | 90 | 0.2 | 1 hour. |
| 10 | 90 | 0.5 | ½ hour. |
| 10 | 90 | 1.0 | Less than ½ hour. |

[1] Monochloromethyl phosphonic acid.
[2] Monobutyl-2-thiadodecylphosphonate.
[3] In 60/40 by weight mixture of powdered aluminum and diethylcyclohexane.

The foregoing data indicate the necessity for at least a small amount of acid in the ester to effect suitable gel formation. In addition, it appears that at least about 0.15% by weight of total additive is required to obtain a substantial gel structure, though some thickening can be obtained with less.

It is also evident that there is some improvement in the rapidity of gel formation brought about by increasing the acid content of the additive up to 10%. However, no further improvement is observed beyond that limit. The following test was performed to determine the lower limits of the acid-ester ratio at which satisfactory gel formation can still occur.

EXAMPLE V

To separate quantities of a 60/40 by weight mixture of powdered aluminum and diethylcyclohexane were added 0.5% by weight of monobutyl-2-thiadodecylphosphate containing 0–10% by weight monochloromethyl phosphonic acid. Each sample was stirred and then allowed to stand in order to observe its gelling characteristics. The results are shown in the following table.

TABLE II.—EFFECT OF ACID-ESTER RATIO ON GELATION

| Acid content of additive percent wt. | Ester content of additive, percent wt. | Time for gel formation, hrs. |
| --- | --- | --- |
| 0 | 100.0 | No gel formed. |
| 0.5 | 99.5 | Do. |
| 1.0 | 99.0 | Do. |
| 1.5 | 98.5 | Do. |
| 2.0 | 98.0 | 16 hours. |
| 3.0 | 97.0 | 3 hours. |
| 5.0 | 95.0 | ½ hour. |
| 10.0 | 90.0 | Do. |

The above data show clearly that the gel-forming agent should contain at least about 2.0% by weight of the acid.

The following examples illustrate still further the composition according to the present invention.

EXAMPLE VI

A kettle equipped with a high-speed stirrer was used in the preparation of the following composition. 70 parts by weight of boron having an average particle size of about 1 micron diameter was dispersed by means of high-speed stirring in 30 parts by weight of jet fuel meeting JP-4 fuel specifications to which was added 0.5% by weight of a mixture of about 97% monobutyl 2-thiadodecylphosphonate and 3% monochloromethyl phosphonic acid.

EXAMPLE VII

A similar composition was prepared by dispersing propellant grade aluminum powder in JP-4 jet hydrocarbon fuel, the thixotropic suspending agent being monobutyl 2-thiadodecylphosphonate containing above 2.5% monochloromethyl phosphonic acid.

EXAMPLE VIII

Boron powder having an average particle size of about 2 microns diameter was dispersed in diethylcyclohexane, the thixotropic suspending agent being 95–97% monoethyl 2-thiadodecylphosphonate and 3–5% monochloromethyl phosphonic acid. The compositions contained 1% by weight of the phosphonate based on the hydrocarbon, 60% of diethyl cyclohexane and 40% by weight of boron.

EXAMPLE IX

High-energy fuel compositions are provided by the combination of 70% aluminum, 0.1 to 1.0% of a mixture of 90% monobutyl 2-thianonylphosphonate and 10% of phosphoric acid suspended in 29% by weight of a mixture of decalins.

EXAMPLE X

70% aluminum powder in 30% diethyl cyclohexane when admixed formed a slurry having a consistency of wet sand. Addition of 0.2% of monobutyl 2-thiadecylphosphonate containing 2–10% monochloromethyl phosphonic acid formed a thixotropic suspension which was mobile and easily pumpable. Viscosity/shear data on this suspension was obtained as follows:

| Shear rate (Sec.$^{-1}$) | Apparent viscosity (poises) |
| --- | --- |
| 5 | 250 |
| 100 | 40 |
| 1000 | 1.6 |

EXAMPLE XI

A thixotropic propellant composition was provided by suspending 15% aluminum and 65% ammonium perchlorate in 20% of kerosene hydrocarbons, the dispersion being aided by the presence of 1% by weight of a copolymer of 2-methyl-5-vinylpyridine, stearyl methacrylate and lauryl methacrylate in 1:5:2.5 mol ratio having an average molecular weight of about 800,000. The thixotropic gelling agent for this composition is 0.1–0.5% by weight of a mixture of monobutyl 2-thiaoctadecylphosphonate and 2.5–10% monochloromethyl phosphonic acid based on the hydrocarbon.

EXAMPLE XII

The addition of 2% of monobutyl 2-thiadodecylphosphonate containing 2.5–5.0% monochloromethyl phosphonic acid to diethyl cyclohexane containing 70% of aluminum or boron formed a solid gel capable of withstanding temperatures of 350° F. without change in structure or stability of the gel.

EXAMPLE XIII

A high-energy fuel composition having improved burning rate is provided by the combination of 2% powdered iron particles, 0.01% of a solution of 97% monobutyl-2-thiadodecylphosphonate and 3% monochloromethyl phosphonic acid dispersed in a solid rocket propellant.

EXAMPLE XIV

A thixotropic composition is formed by adding powdered magnesium to a solution of gasoline hydrocarbons and a mixture of 5% monofluoropropyl phosphonic acid and 95% monodecyl-2-thiadodecylphosphonate, the composition of the gelled material being as follows:

| | Percent by wt. |
| --- | --- |
| Gasoline hydrocarbons | 60 |
| Powdered magnesium | 40 |
| Acid-ester mixture | 5 |

EXAMPLE XV

When about 0.5% by weight of a mixture of 97.5% monobutyl-2-thiadodecylphosphonate and 10–2.5% of phosphoric acid was added to a 60/40 mixture of powdered aluminum and diethyl cyclohexane, a stable thixotropic gel was formed.

The alkylthiomethyl phosphonic acid ester and phosphorus acid mixtures and their derivatives as described herein can be used to gel hydrocarbon oils such as natural and synthetic hydrocarbon oils including gasoline, kerosene, gas oil, burner fuel oil, lubricating oil containing metal powders for use in various industrial applications such as lubricants for the drawing of metals, gear lubricants, greases and many other applications.

We claim as our invention:

1. A thixotropic composition consisting essentially of a mixture of finely divided particles selected from the group consisting of metal particles and metal hydride particles in a liquid hydrocarbon, gelled by admixutre therewith of (a) 98–90% by weight of a monoester of a hydrocarbyl-thiomethyl phosphonic acid and a $C_{1-18}$ alkanol and (b) 2–10% by weight of a di- to tri-basic pentavalent phosphorus acid having from 0 to 1 monohaloalkyl substituents, wherein the alkyl group contains from 1 to 4 carbon atoms.

2. A thixotropic composition consisting essentially of a mixture of finely divided metal particles and a liquid hydrocarbon, gelled by admixture therewith of from about 0.15% to about 10% of a mixture of (a) 98–90% by weight of a monoester of $C_{4-18}$ alkyl thiomethyl phosphonic acid and a $C_{1-18}$ alkanol and (b) 2–10% by weight of a di- to tri-basic pentavalent phosphorus acid having from 0 to 1 monohaloalkyl substituents, wherein the alkyl group contains from 1 to 4 carbon atoms.

3. A thixotropic composition consisting essentially of a mixture of finely divided metal particles selected from the group consisting of boron, beryllium, magnesium, aluminum, iron, titanium, boron carbide and aluminumboride in a liquid hydrocarbon, gelled by admixture therewith of from about 0.15% to about 10% of a mixture of (a) 98–90% by weight of a monoester of $C_{4-18}$ alkyl thiomethyl phosphonic acid and a $C_{1-18}$ alkanol and (b) 2–10% by weight of a di- to tri-basic pentavalent phosphorus acid having from 0 to 1 monohaloalkyl substituents, wherein the alkyl group contains from 1- to 4 carbon atoms.

4. A thixotropic composition consisting essentially of a mixture of boron powder and a liquid hydrocarbon, gelled by admixture therewith of from about 0.15% to about 5% of a mixture 98–90% by weight of monobutyl 2-thiadodecylphosphonate and 2–10% by weight of monochloromethyl phosphonic acid.

5. A thixotropic composition consisting essentially of a mixture of aluminum powder and a liquid hydrocarbon, gelled by admixture therewith of from about 0.15% to about 5% of a mixture 98–90% by weight monobutyl 2-thiadodecylphosphonate and 2–10% by weight monochloromethyl phosphonic acid.

6. A thixotropic composition consisting essentially of a mixture of aluminum powder and a liquid hydrocarbon, gelled by admixture therewith of from about 0.15% to about 5% of a mixture 98–90% by weight monobutyl 2-thiadodecylphosphonate and 2–10% by weight phosphoric acid.

7. A thixotropic composition consisting essentially of a mixture of decaborane and a liquid hydrocarbon fuel, gelled by admixture therewith of from about 0.15% to about 5% of a mixture 98–90% by weight monobutyl 2-thiadodecylphosphonate and 2–10% by weight monochloromethyl phosphonic acid.

8. A thixotropic composition consisting essentially of a mixture of aluminum hydride powder and a liquid hydrocarbon fuel, gelled by admixture therewith of from about 0.15% to about 5% of a mixture 98–90% by weight monobutyl 2-thiadodecylphosphonate and 2–10% by weight monochloromethyl phosphonic acid.

9. A thixotropic composition consisting essentially of a mixture of beryllium hydride powder and a liquid hydrocarbon fuel, gelled by admixture therewith of from about 0.15% to about 5% of a mixture 98–90% by weight monobutyl 2-thiadodecylphosphonate and 2–10% by weight monochloromethyl phosphonic acid.

10. A thixotropic composition consisting essentially of a mixture of 5–80% of boron powder and the balance being liquid hydrocarbon fuel, gelled by admixture therewith of from about 0.15% to about 5% of a mixture 98–90% by weight monobutyl 2-thiadodecylphosphonate and 2–10% by weight monochloromethyl phosphonic acid.

11. A thixotropic composition consisting essentially of a mixture of 5–80% of aluminum powder and the balance being liquid hydrocarbon fuel, gelled by admixture therewith of from about 0.15% to about 5% of a mixture 98–90% by weight monobutyl 2-thiadodecylphosphonate and 2–10% by weight monochloromethyl phosphonic acid.

12. A thixotropic composition consisting essentially of a mixture of 5–80% of aluminum hydride powder and the balance being liquid hydrocarbon fuel, gelled by admixture therewith of from about 0.15% to about 5% of a mixture 98–90% by weight monobutyl 2-thiadodecylphosphonate and 2–10% by weight monochloromethyl phosphonic acid.

13. A thixotropic composition consisting essentially of a mixture of 5–80% of beryllium hydride power and the balance being liquid hydrocarbon fuel, gelled by addition therewith of from about 0.15% to about 5% of a mixture 98–90% by weight monobutyl 2-thiadodecylphosphonate and 2–10% by weight monochloromethyl phosphonic acid.

14. A thixotropic composition consisting essentially of a mixture of 5–80% of iron powder and the balance being liquid hydrocarbon fuel, gelled by addition therewith of from about 0.15% to about 5% of a mixture 98–90% by weight monobutyl 2-thiadodecylphosphonate and 2–10% by weight monochloromethyl phosphonic acid.

15. The composition of claim 9 containing a minor amount of a dispersing agent.

16. The composition of claim 10 containing a minor amount of a dispersing agent.

References Cited

UNITED STATES PATENTS

| | | | |
|---|---|---|---|
| 2,890,108 | 6/1959 | Toulmin | 50—35.4 |
| 2,927,849 | 3/1960 | Greblick et al. | 149—19X |
| 3,084,033 | 4/1963 | Kelly et al. | 149—19X |
| 3,095,334 | 6/1963 | Scurlock | 149—19X |
| 3,105,747 | 10/1963 | Calhoun et al. | 44—7 |
| 3,113,894 | 12/1963 | Burton | 149—19 |
| 3,116,187 | 12/1963 | Scanlon et al. | 149—36X |

BENJAMIN R. PADGETT, Primary Examiner

U.S. Cl. X.R.

49—18, 22, 109; 44—7